(12) United States Patent
Cooley et al.

(10) Patent No.: US 8,042,161 B1
(45) Date of Patent: Oct. 18, 2011

(54) AUTOMATIC SHARING OF WHITELIST DATA

(75) Inventors: Shaun Cooley, El Segundo, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1172 days.

(21) Appl. No.: 11/693,623

(22) Filed: Mar. 29, 2007

Related U.S. Application Data

(63) Continuation-in-part of application No. 11/562,948, filed on Nov. 22, 2006.

(51) Int. Cl.
H04L 29/06 (2006.01)

(52) U.S. Cl. ............... 726/6; 726/2; 726/22; 726/26; 713/165; 713/168; 713/169; 380/255; 705/51; 705/67; 707/705; 709/204; 709/237

(58) Field of Classification Search .......... 726/2, 4, 726/6, 24, 25, 26, 27, 28, 29, 23, 22; 713/161, 713/165, 168, 169, 170; 705/51, 67; 709/205, 709/206, 237, 204; 380/255; 707/705
See application file for complete search history.

(56) References Cited

U.S. PATENT DOCUMENTS

| | | | | |
|---|---|---|---|---|
| 6,092,201 A * | 7/2000 | Turnbull et al. | ............ | 726/4 |
| 6,574,658 B1 * | 6/2003 | Gabber et al. | ............ | 709/206 |
| 7,099,444 B1 * | 8/2006 | Russell | ............ | 379/142.02 |
| 7,206,814 B2 * | 4/2007 | Kirsch | ............ | 709/206 |
| 7,222,158 B2 * | 5/2007 | Wexelblat | ............ | 709/206 |
| 7,426,382 B2 * | 9/2008 | Aerrabotu et al. | ............ | 455/411 |
| 7,562,119 B2 * | 7/2009 | Smith et al. | ............ | 709/206 |
| 7,571,325 B1 * | 8/2009 | Cooley et al. | ............ | 713/181 |
| 7,653,698 B2 * | 1/2010 | Wieneke et al. | ............ | 709/206 |
| 7,716,469 B2 * | 5/2010 | Bhatnagar et al. | ............ | 713/156 |
| 2003/0046097 A1 * | 3/2003 | LaSalle et al. | ............ | 705/1 |
| 2003/0172291 A1 * | 9/2003 | Judge et al. | ............ | 713/200 |
| 2004/0203589 A1 * | 10/2004 | Wang et al. | ............ | 455/410 |
| 2004/0203598 A1 * | 10/2004 | Aerrabotu et al. | ............ | 455/411 |
| 2004/0255122 A1 * | 12/2004 | Ingerman et al. | ............ | 713/176 |
| 2005/0021964 A1 * | 1/2005 | Bhatnagar et al. | ............ | 713/175 |
| 2005/0080855 A1 * | 4/2005 | Murray | ............ | 709/206 |
| 2005/0080856 A1 * | 4/2005 | Kirsch | ............ | 709/206 |
| 2005/0138430 A1 * | 6/2005 | Landsman | ............ | 713/201 |
| 2005/0144279 A1 * | 6/2005 | Wexelblat | ............ | 709/225 |
| 2005/0220304 A1 * | 10/2005 | Lenoir et al. | ............ | 380/255 |
| 2008/0104186 A1 * | 5/2008 | Wieneke et al. | ............ | 709/206 |

OTHER PUBLICATIONS

Shane Hird, "Technical Solutions for Controlling Spam", pp. 1-17, Proceedings of AUUG2002, Melbourne, Sep. 2002.*

* cited by examiner

*Primary Examiner* — Nasser Moazzami
*Assistant Examiner* — Shanto M Abedin
(74) *Attorney, Agent, or Firm* — Brill Law Office; Jeffrey Brill

(57) ABSTRACT

Whitelists are automatically shared between users and/or domains without compromising user/domain privacy. Potential trust partners with whom to share whitelist data are automatically identified. A handshaking procedure is carried out to confirm the trust relationship and verify the partner's identity. Once a trust partner is confirmed, the parties can exchange acceptance criteria specifying the types of whitelist data they want to receive. Each party can provide the other with the appropriate entries from its own whitelist. The parties keep each other updated, as their own whitelists change.

14 Claims, 5 Drawing Sheets

AUTOMATIC SHARING OF WHITELIST DATA

RELATED APPLICATION

This application is a Continuation in Part of commonly assigned patent application Ser. No. 11/562,948, filed on Nov. 22, 2006, titled "Time and Threshold Based Whitelisting" (the "Automatic Whitelisting Application"). The Automatic Whitelisting Application is incorporated herein by reference in its entirety.

TECHNICAL FIELD

This invention pertains generally to computer security, and more specifically to sharing whitelists of trusted email addresses.

BACKGROUND ART

Current email systems typically include whitelists of trusted email addresses and domains. An incoming email from a whitelisted entry is presumed to be legitimate, and is therefore delivered to the addressee without being subject to scanning for spam or other processing to check for malicious email. Checking for spam and other security processing consumes both time and computing resources, so it is desirable to be able to bypass it when email is known to be legitimate.

Currently available automated whitelisting techniques use very simple mechanisms, such as adding all parties to whom a user sends email to a whitelist. Whitelists created this way often include entries that are not truly legitimate. For example, a user might send an email to a business from whom the user does not wish to receive automatically generated commercial emails. The user might even send an email requesting to be removed from an email list. Clearly, in situations such as these, the user does not want the recipient added to the whitelist. These currently available simple whitelisting mechanisms also lead to the creation of very large whitelists that are typically very difficult and time consuming for users to manage. This problem becomes much worse when these simple mechanisms are applied for multiple users at a gateway or domain level.

The Automatic Whitelisting Application describes methodologies that a local client or gateway can use to better manage whitelists, by using time and threshold based values to automatically promote provisional whitelist entries to permanent status. The Automatic Whitelisting Application also discusses using a threshold to promote an entire domain to permanent status, such that an email from anyone at a whitelisted domain is accepted as non-spam.

The invention of the Automatic Whitelisting Application is very useful, but lacks a mechanism for establishing associative trust that could allow quicker provisional promotion for "friend of friend" senders. What is needed are methods, computer readable media and computer systems for automatically sharing whitelist data between users or domains while at the same time maintaining privacy at a user/domain level.

SUMMARY

Whitelists are automatically shared between users and/or domains without compromising privacy. Potential trust partners with whom to share whitelist data are automatically identified. A handshaking procedure is carried out to confirm the trust relationship and verify the partner's identity. Once a trust partner is confirmed, the parties can exchange acceptance criteria specifying the types of whitelist data they want to receive. Each party provides the other with the appropriate entries from its own whitelist. The parties keep each other updated, as their own whitelists change.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
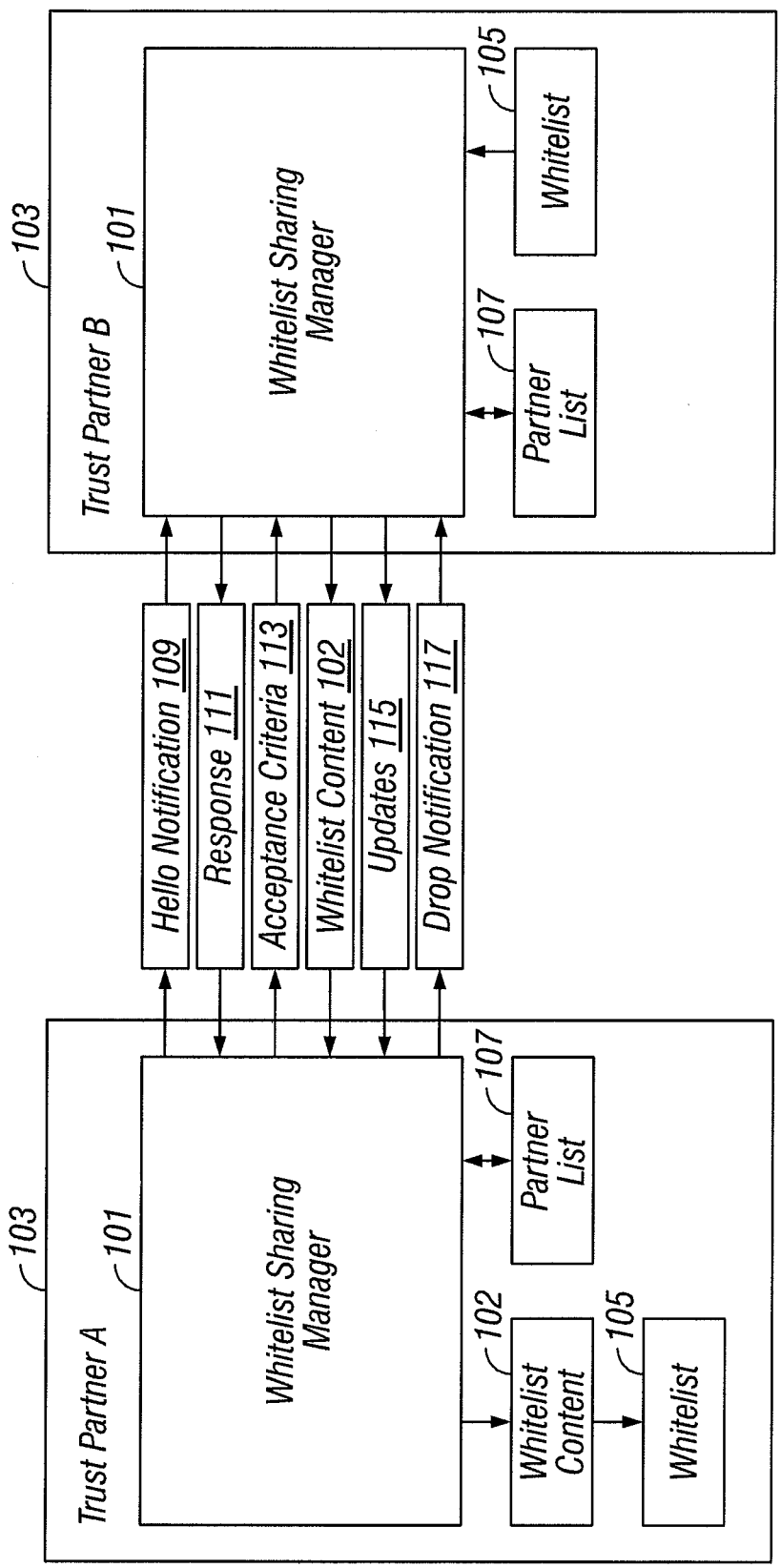
FIG. 1 is a block diagram illustrating the operations of a whitelist sharing manager, according to some embodiments of the present invention.
Figure 2:
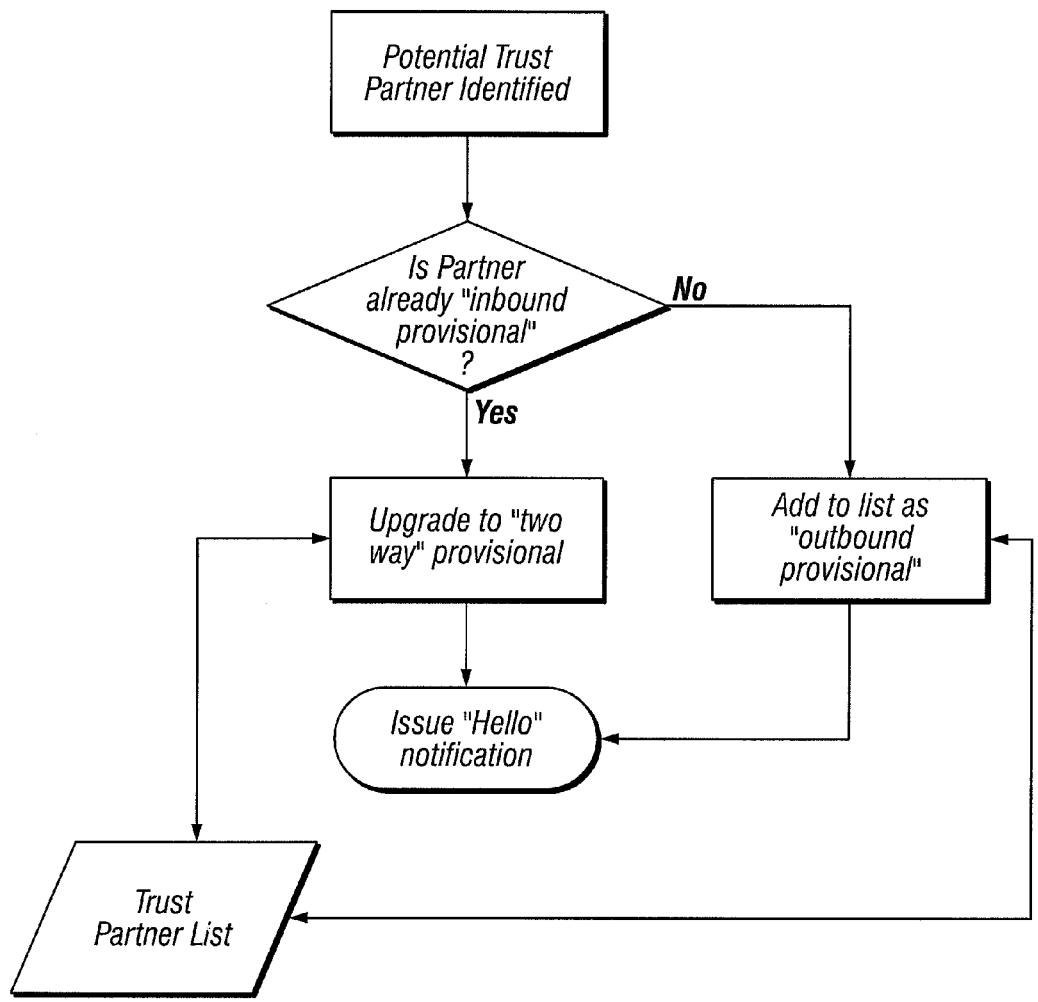
FIGS. 2-6 are flowcharts illustrating steps that a whitelist sharing manager executes, according to certain embodiments of the present invention.
Figure 3:
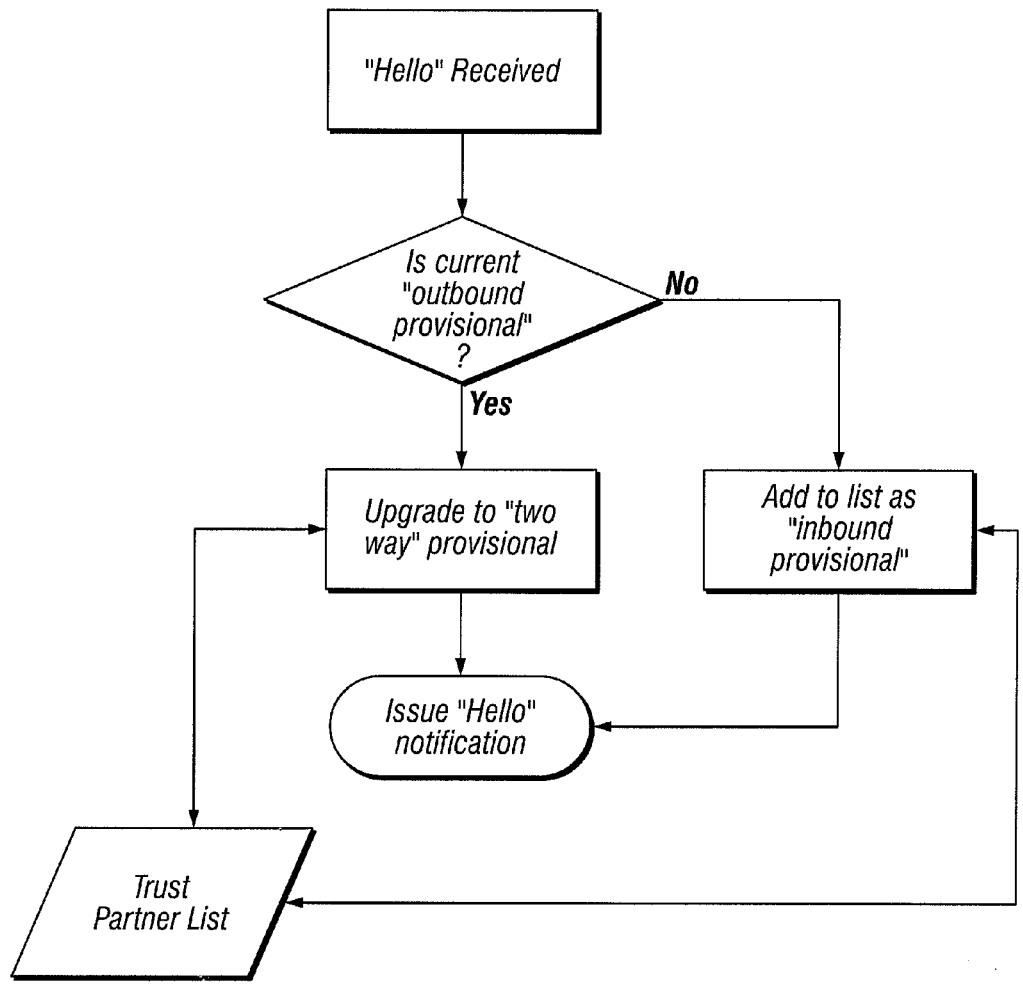
Figure 4:
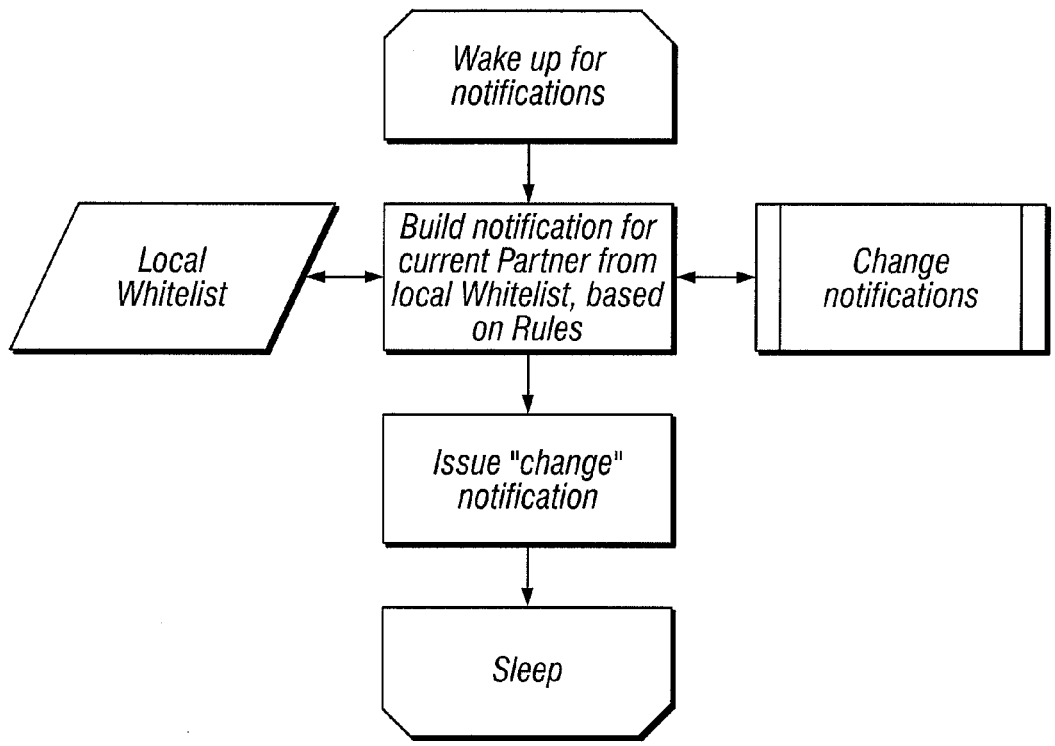
Figure 5:
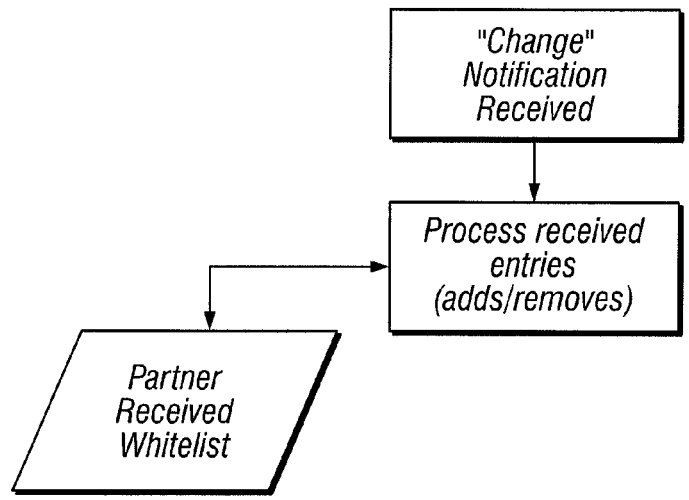
Figure 6:
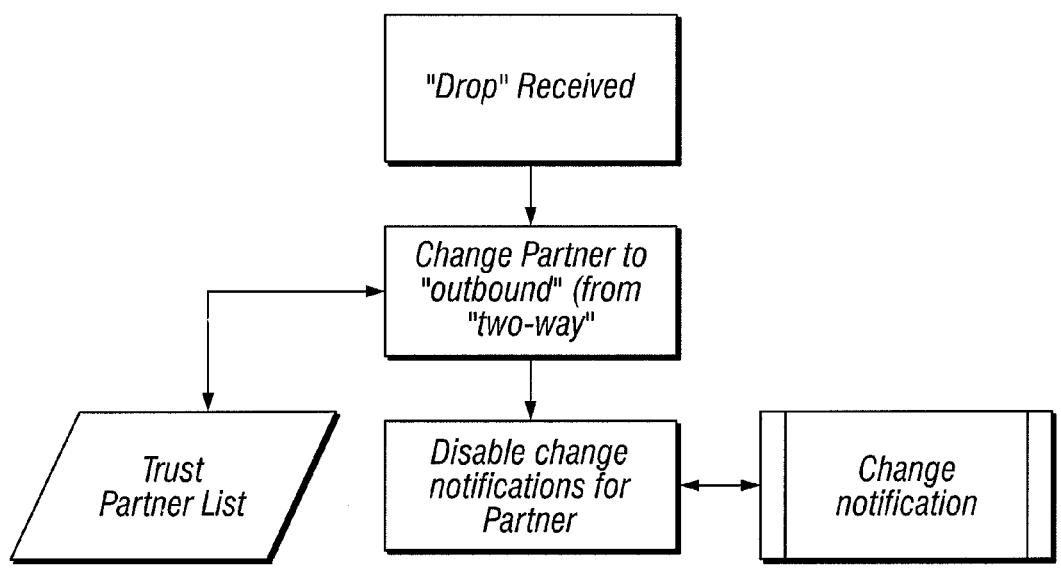

FIG. 1 illustrates a whitelist sharing manager 101, according to some embodiments of the present invention. It is to be understood that although the whitelist sharing manager 101 is illustrated as a single entity, as the term is used herein a whitelist sharing manager 101 refers to a collection of functionalities which can be implemented as software, hardware, firmware or any combination of these. Where a whitelist sharing manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, the operations of the whitelist sharing manager 101 enable the exchange of associative trust information 102 (e.g., whitelist entries) with trust partners 103 (e.g., other emails servers, gateways, domains, etc.) without compromising email whitelist 105 privacy. This is accomplished by automatically recognizing potential trust partners $103_{potential}$, and exchanging whitelist content 102 therewith based on an established level of cooperation. The whitelist sharing manager 101 automatically identifies potential trust partners $103_{potential}$, according to the methodology disclosed in the Automatic Whitelisting Application. It is to be understood that as discussed in the Automatic Whitelisting Application, a potentially trusted party $103_{potential}$ can be in the form of an individual email user, an email server, an email gateway, or an entire domain as desired.

Whenever a potential trust partner $103_{potential}$ is identified, the whitelist sharing manager 101 adds it to a list 107 of trust partners with an initial status 108 of "outbound provisional." If the potential trust partner $103_{potential}$ is already on the list 107 with a status 108 of "inbound provisional" (inbound provisional status 108 is discussed below), the status 108 of the potential trust partner $103_{potential}$ is upgraded to "two-way provisional." At the time a potential trust partner $103_{potential}$ is added to the list 107 (or upgraded in status 108 to "two-way"), the whitelist sharing manager 101 sends an initial "hello" notification 109 to the potential trust partner $103_{potential}$. This notification 109 is received and processed by the whitelist sharing manager 101 of the potential trust partner $103_{potential}$ as discussed below.

When a whitelist sharing manager 101 receives a "hello" notification 109, it adds the sender $103_{potential}$ of the notification 109 to its trust partner list 107 with a status 108 of "inbound provisional." If the sender $103_{potential}$ was already on the list 107 with an "outbound provisional" status 108, its status 108 is upgraded to "two-way provisional." When a sender (a form of potential trust partner $103_{potential}$) is added with "inbound provisional" status 108, the whitelist sharing manager 101 sends them a response notification 111 specifying that the trust is only one way. If the sender $103_{potential}$ was already on the list 107 as "outbound provisional" and is upgraded in status 108 to "two-way provisional," the response 111 informs the potential trust partner $103_{potential}$ that the potential trust relationship is now two-way.

By sending hello and response notifications 109/111, whitelist sharing managers 101 can both prove their own authenticity and confirm that the other party is in fact whom it claims to be. When a message 109/111 is received from a potential trust partner $103_{potential}$, the receiving party can check the message 109/111 for authenticity using Domain-Keys, Sender Policy Framework ("SPF") or a similar verification service. If the authenticity of the message response checks out, the status 108 of the trust partner is upgraded from "provisional" to "confirmed" (e.g., inbound provisional to inbound confirmed, or two-way provisional to two-way confirmed).

It is to be understood that the exchanges of notifications 109/111 and various provisional status 108 states are a form of handshaking, in which the parties engage to determine whether they wish to share whitelist information 102. Once a partnership reaches the status 108 of "two-way confirmed," actual sharing can occur. At this point, either trust partner $103_{confirmed}$ may issue an indication 113 to the other specifying what associative data 102 (i.e., entries whitelisted by the other partner $103_{confirmed}$) it would like to receive and add to its own whitelist 105. The parameters specifying what associative data 102 to accept can be configured by, e.g., the domain or system administrator. These parameters can also be seeded with default criteria. What whitelist data 102 to accept from a confirmed partner $103_{confirmed}$ is a variable design parameter, and can be based on factors such as how long the entry 102 has been on the partner's $103_{confirmed}$ whitelist 105 with provisional and/or permanent status, the length of the trust relationship with the partner $103_{confirmed}$, the percentage of emails from the entry 102 reported as spam (if available), specific individual email addresses and/or domain entries, etc. In some embodiments, a party can simply accept the entire contents 102 of the whitelist(s) 105 of one or more trust partners $103_{confirmed}$. Often, a party only accepts a subset of the whitelist entries 102 of trust partners $103_{confirmed}$, according to its acceptance parameters.

A trust partner $103_{confirmed}$ transmits to its other partner $103_{confirmed}$ its own whitelist entries 102 that meet the specified acceptance criteria of that other partner $103_{confirmed}$. As a party receives such associative whitelist entries 102, it adds them to its own whitelist 105. As additional whitelist entries 102 meet the acceptance criteria specified by the other partner $103_{confirmed}$ and/or existing entries 102 cease to, the partners $103_{confirmed}$ send up dates 115 to each other indicating these changes. These updates 115 can be transmitted at a default update frequency or one specified by the receiving partner $103_{confirmed}$. Thus, the initial transfer of whitelist data 102 contains the bulk of the whitelist entries, and follow-up notifications 115 only contain additions and removals therefrom. If a party's $103_{confirmed}$ whitelist data 102 has not changed with respect to its partner's $103_{confirmed}$ specified criteria, the party $103_{confirmed}$ still typically transmits "no-change" notifications 115 at the specified intervals.

In some embodiments, if a party $103_{confirmed}$ fails to receive a configured or default number of consecutive interval notifications 115 (e.g., three) from a partner $103_{confirmed}$, the party $103_{confirmed}$ drops its trust relationship with that partner 103, and removes all corresponding associative trust entries 102 from its own whitelist 105. When a trust relationship is dropped, the dropping party 103 issues a "drop" notification 117 to the other partner 103. When a "drop" notification 117 is received, the receiving partner 103 changes the status 108 for that partner 103 back to "outbound provisional" or "outbound confirmed" (instead of "two-way"). The receiving partner 103 also stops transmitting change notifications 115.

To maintain privacy, whitelist entries can be shared via MD5 (or similar) hashes. Notifications and other communication can be conducted between partners 103 via standardized emails, or other formats as desired. Exchanges can occur between standardized accounts configured for this purpose, such as, e.g., AssocTrustMaster@domain.xyz or the like. Lastly, any email received that doesn't authenticate via DomainKeys, SPF or the like is typically ignored. Thus, in some embodiments the associative trust exchange requires both parties to support DomainKeys, SPF or a similar service.

FIGS. 2-6 are flowcharts that illustrate steps that a whitelist sharing manager 101 can execute in order to identify and confirm trust partners 103, provide shared whitelist content 102 to confirmed partners $103_{confirmed}$, issue and process change (update) notifications 115, and drop partners 103. It is to be understood that these flowcharts simply illustrate examples of the execution of such steps according to some embodiments of the present invention.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, notifications, statuses and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies, notifications, statuses and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for sharing whitelist information, the method comprising the steps of:
    automatically identifying, by a computer, at least one potential trust partner with whom to share whitelist data;
    executing, by a computer, a handshaking procedure with the at least one identified potential trust partner, in order to confirm a trust relationship;
    responsive to confirming a trust relationship with at least one trust partner, transmitting, by a computer, criteria to the at least one confirmed trust partner, said criteria indicating what whitelist data the confirmed trust partner is to share;
    receiving, by a computer, whitelist data from the at least one confirmed trust partner, responsive to the transmitted criteria;
    adding, by a computer, the received whitelist data to a local whitelist;
    receiving, by a computer, updates to the received whitelist data from the at least one confirmed trust partner according to an update schedule;
    updating, by a computer, the local whitelist based on the received updates; and
    responsive to not receiving a specified number of scheduled updates from a confirmed trust partner, dropping, by a computer, the trust relationship with that trust partner.

2. The method of claim 1 wherein executing a handshaking procedure with an identified potential trust partner further comprises:
    transmitting a notification to the potential trust partner;
    receiving a response from the potential trust partner; and
    verifying identity of the potential trust partner.

3. The method of claim 1 further comprising:
    receiving criteria from a confirmed trust partner, said criteria indicating what whitelist data to share with that confirmed trust partner; and
    transmitting whitelist data to that confirmed trust partner, responsive to the received transmitted criteria.

4. The method of claim 1 further comprising:
    transmitting whitelist data updates to at least one confirmed trust partner according to an update schedule.

5. The method of claim 1 further comprising:
    responsive to receiving a drop notification from a trust partner, dropping the trust relationship with that trust partner.

6. At least one non-transitory computer readable medium storing a computer program product for sharing whitelist information, the computer program product comprising:
    program code for automatically identifying at least one potential trust partner with whom to share whitelist data;
    program code for executing a handshaking procedure with the at least one identified potential trust partner, in order to confirm a trust relationship;
    program code for, responsive to confirming a trust relationship with at least one trust partner, transmitting criteria to the at least one confirmed trust partner, said criteria indicating what whitelist data the confirmed trust partner is to share;
    program code for receiving whitelist data from the at least one confirmed trust partner, responsive to the transmitted criteria;
    program code for adding the received whitelist data to a local whitelist;
    program code for receiving updates to the received whitelist data from the at least one confirmed trust partner according to an update schedule;
    program code for updating the local whitelist based on the received updates; and
    program code for, responsive to not receiving a specified number of scheduled updates from a confirmed trust partner, dropping the trust relationship with that trust partner.

7. The computer readable medium storing the computer program product of claim 6 wherein the program code for executing a handshaking procedure with an identified potential trust partner further comprises:
    program code for transmitting a notification to the potential trust partner;
    program code for receiving a response from the potential trust partner; and
    program code for verifying identity of the potential trust partner.

8. The computer readable medium storing the computer program product of claim 6 further comprising:
    program code for receiving criteria from a confirmed trust partner, said criteria indicating what whitelist data to share with that confirmed trust partner; and
    program code for transmitting whitelist data to that confirmed trust partner, responsive to the received transmitted criteria.

9. The computer readable medium storing the computer program product of claim 6 further comprising:
    program code for transmitting whitelist data updates to at least one confirmed trust partner according to an update schedule.

10. The computer readable medium storing the computer program product of claim 6 further comprising:
    program code for, responsive to receiving a drop notification from a trust partner, dropping the trust relationship with that trust partner.

11. A computer system for sharing whitelist information, the computer system comprising:
    hardware implemented means for automatically identifying at least one potential trust partner with whom to share whitelist data;
    hardware implemented means for executing a handshaking procedure with the at least one identified potential trust partner, in order to confirm a trust relationship;
    hardware implemented means for, responsive to confirming a trust relationship with at least one trust partner, transmitting criteria to the at least one confirmed trust partner, said criteria indicating what whitelist data the confirmed trust partner is to share;
    hardware implemented means for receiving whitelist data from the at least one confirmed trust partner, responsive to the transmitted criteria;
    hardware implemented means for adding the received whitelist data to a local whitelist;
    hardware implemented means for receiving updates to the received whitelist data from the at least one confirmed trust partner according to an update schedule;

hardware implemented means for updating the local whitelist based on the received updates; and hardware implemented means for, responsive to not receiving a specified number of scheduled updates from a confirmed trust partner, dropping the trust relationship with that trust partner.

12. The computer system of claim 11 wherein the means for executing a handshaking procedure with an identified potential trust partner further comprise:

hardware implemented means for transmitting a notification to the potential trust partner;

hardware implemented means for receiving a response from the potential trust partner; and hardware implemented means for verifying identity of the potential trust partner.

13. The computer system of claim 11 further comprising:

hardware implemented means for receiving criteria from a confirmed trust partner, said criteria indicating what whitelist data to share with that confirmed trust partner; and hardware implemented means for transmitting whitelist data to that confirmed trust partner, responsive to the received transmitted criteria.

14. The computer system of claim 11 further comprising:

hardware implemented means for transmitting whitelist data updates to at least one confirmed trust partner according to an update schedule.

* * * * *